(12) United States Patent
Wenz et al.

(10) Patent No.: US 7,868,070 B2
(45) Date of Patent: Jan. 11, 2011

(54) POLYCARBONATE MOLDING COMPOSITIONS

(75) Inventors: Eckhard Wenz, Köln (DE); Uwe Peucker, Krefeld (DE); Thomas Eckel, Dormagen (DE); Dieter Wittmann, Leverkusen (DE); Arno Nennemann, Bergisch Gladbach (DE); Vera Buchholz, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 670 days.

(21) Appl. No.: 11/636,806

(22) Filed: Dec. 11, 2006

(65) Prior Publication Data

US 2007/0142535 A1 Jun. 21, 2007

(30) Foreign Application Priority Data

Dec. 17, 2005 (DE) .................. 10 2005 060 463

(51) Int. Cl.
*C08L 69/00* (2006.01)
*C08K 3/34* (2006.01)

(52) U.S. Cl. ............. 524/127; 524/123; 524/140; 524/141; 524/444; 524/445; 524/449; 524/451

(58) Field of Classification Search .............. None
See application file for complete search history.

(56) References Cited

U.S. PATENT DOCUMENTS

| 5,096,727 | A | * | 3/1992 | Crace ................... 426/314 |
| 5,552,469 | A | * | 9/1996 | Beall et al. ............ 524/445 |
| 5,747,575 | A | | 5/1998 | Nishida et al. ......... 524/443 |
| 6,238,793 | B1 | | 5/2001 | Takahashi et al. ...... 428/403 |
| 6,365,101 | B1 | * | 4/2002 | Nguyen et al. ......... 422/13 |
| 6,579,927 | B1 | | 6/2003 | Fischer ................. 524/445 |
| 6,812,272 | B2 | | 11/2004 | Fischer ................. 524/445 |
| 2003/0060556 | A1 | | 3/2003 | Fischer ................. 524/445 |
| 2004/0030021 | A1 | * | 2/2004 | Mitsunaga et al. ..... 524/442 |
| 2004/0242751 | A1 | | 12/2004 | Fischer ................. 524/445 |
| 2005/0137287 | A1 | | 6/2005 | Giannelis et al. ....... 523/216 |
| 2005/0272903 | A1 | * | 12/2005 | Mitsunaga et al. ..... 528/196 |
| 2006/0079614 | A1 | * | 4/2006 | Kikuchi ................. 524/115 |

FOREIGN PATENT DOCUMENTS

JP 07228762 * 8/1995
WO 99/43747 9/1999

OTHER PUBLICATIONS

Southern Clay Products Product Bulletin for Nanofil 116; no date.*
Polymer Degradation and Stability, 80 (month unavailable) 2003, p. 157-161, Shaofeng Wang et al, "Synthesis and characterization of polycarbonate/ABS/montmorillonite nanocomposites".
Polymer, 44, (month unavailable) 2003, p. 5341-5354, P.J. Yoon et al, "Polycarbonate nanocomposites: Part 2. Degradation and color formation".
Applied Clay Science, 25, No. 1-2 (month unavailable) 2004, p. 44-55, Shaofeng Wang et al, "Preparation and characterization of flame retardant ABS/montmorillonite nanocomposite".
Mat. Res. Soc. Symp. Proc., vol. 519, (month unavailable) 1998, p. 117-123, H.R. Fischer et al, "Nanocomposites from Polymers and Layered Minerals".
Polymer Preprints, 42(2), (month unavailable) 2001, p. 50-51, Holly A. Stretz et al, "Flame Retardant Properties of Polycarbonate/Montmorillonite Clay Nanocomposite Blends".

* cited by examiner

*Primary Examiner*—David Buttner
(74) *Attorney, Agent, or Firm*—Baker Donelson Bearman, Caldwell & Berkowitz, PC

(57) ABSTRACT

A thermoplastic molding composition that features improved thermal stability and a relatively low maximum rate of decomposition in the event of fire is disclosed. The composition contains an aromatic polycarbonate and/or polyester carbonate, and a modified layered compound, the modification with organic polymer by means of a solvent-free melt process. Optional additional components include an impact modifier, a thermoplastic (co)copolymer, and a phosphorus compound.

15 Claims, No Drawings

POLYCARBONATE MOLDING COMPOSITIONS

FIELD OF THE INVENTION

The invention relates to thermoplastic molding compositions and in particular to polycarbonate compositions.

TECHNICAL BACKGROUND OF THE INVENTION

Compositions containing polycarbonate (PC) and ABS (acrylonitrile/butadiene/styrene) and including alkylammonium montmorillonite preferentially distributed in the ABS phase were reported to have increased thermal stability by Wang et al. (Wang, S., Hu, Y., Wang, Z., Yong, T., Chen, Z., & Fan, W., Synthesis and Characterization of polycarbonate/ABS/montmorillonite nanocomposites, Polymer Degradation and Stability, 80, No. 1, (2003) 157-61).

It is also known that conventional alkylammonium modifiers, such as tallow fat-bis(2-hydroxyethyl)methylammonium and impurities contained therein (for example iron ions) decompose the polycarbonate matrix and, for example, increase the heat release rate (determined by means of cone calorimetry) (see Stretz, H. A., Koo, J. H., Dimas, V. M., & Zhang, Y., Flame retardant properties of polycarbonate/montmorillonite clay nanocomposite blends, Polymer Preprints, 42, no. 2, (2001) 50; Yoon, P. J., Hunter, D. L. & Paul, D. R., Polycarbonate nanocomposites: Part 2. Degradation and color formation, Polymer, 44, no. 18, (2003) 5341-54).

The synergistic effect of alkylammonium montmorillonites for flame retardant properties is known for ABS molding compositions (Wang, S., Hu, Y., Zong, R., Tang, Y., Chen, Z., & Fan, W., Preparation and characterization of flame retardant ABS/montmorillonite nanocomposite. Applied Clay Science, 25, no. 1-2, (2004) 49-55). Wang et al. achieve improved flame retardant properties for ABS moldings in combination with antimony oxide and decabromodiphenyl oxide. In the presence of the alkylammonium montmorillonite, the heat release rate (cone calorimeter) was reduced and the time to ignition was prolonged, i.e. the LOI (limiting oxygen index) was higher and a flammability rating of V-0 in the UL94 V test was achieved.

WO 99/43747 A1 discloses the synergistic effect for flame retardant properties of alkylammonium montmorillonites for PC/ABS compositions. The time to ignition of PC/ABS compositions is prolonged by the addition of alkylammonium montmorillonite.

A disadvantage of the alkylammonium-modified montmorillonites is the involved and expensive modification process for preparing the layered silicate. Layered silicates modified in this way also have an adverse effect on the physical properties of polycarbonate compositions, since the basic modifiers of the layered silicate degrade the polymer and thus lead to a reduction in the molecular weight of the polymer and to clouding and discoloration. U.S. 2005/0137287 A1 discloses polycarbonate compositions which comprise layered silicates modified with a block copolymer of 2-(dimethylamino)-styrene/ethyl methacrylate with a quaternary ammonium end group. The resulting polycarbonate molding compositions are transparent and show no discoloration.

WO 99/07790 A1 and Fischer et al. (Fischer, H. R., Gielgens, L. H., & Koster, T. P. M., Nanocomposites from polymers and layered minerals, Mat. Res. Soc. Proc. vol. 519, 1998, 117-123) disclose nanocomposite materials which comprise block or graft copolymers and a layered silicate, the copolymer carrying a structural unit which is compatible with the layered silicate and a further unit which is compatible with the polymer matrix. In the first step of the preparation of the composite materials the layered silicate is mixed with the copolymer at elevated temperature, and in a subsequent step by extrusion in the polymer matrix sought. Alternatively, a solvent can also be added. An improvement in the tensile strength of the modified material is achieved in this way. PC/ABS compositions and modification processes for the layered silicates via the aqueous route are not described.

Disadvantages of modification by means of block copolymers are the involved and expensive modification processes and the need for an additional process step for synthesizing the block copolymer.

The object on which the invention is based is to provide polycarbonate molding compositions having a high thermal stability, a low maximum rate of decomposition after ignition and a low smoke density.

SUMMARY OF THE INVENTION

A thermoplastic molding composition that features improved thermal stability and a relatively low maximum rate of decomposition in the event of fire is disclosed. The composition contains an aromatic polycarbonate and/or polyester carbonate, and a modified layered compound, the modification with organic polymer by means of a solvent-free melt process. Optional additional components include an impact modifier, a thermoplastic (co)copolymer, and a phosphorus compound.

DETAILED DESCRIPTION OF THE INVENTION

Surprisingly, it has been found that the thermal stability of polycarbonate molding compositions increases and the maximum rate of decomposition in the event of fire is reduced upon the incorporation of modified layered compound, the modification with organic polymers by means of a solvent-free melt process. The compositions according to the invention are distinguished in that no long-chain quaternary ammonium salts are employed as stabilizers and a molecular weight degradation of the polycarbonate is avoided, which also results in a high level of mechanical properties of the molding compositions according to the invention.

The present invention therefore provides thermoplastic molding compositions comprising A) an aromatic polycarbonate and/or polyester carbonate,
B) optionally an impact modifier,
C) optionally a thermoplastic homo- and/or copolymer,
D) an organically modified layered compound, the modification with organic polymers by means of a solvent-free melt process (herein modified layered compound) and
E) optionally a phosphorus compound.

The compositions according to the invention preferably comprise

A) 30 to 99.9 parts by wt., preferably 40 to 90 parts by wt. of aromatic polycarbonate and/or polyester carbonate,
B) 0 to 60 parts by wt., preferably 1 to 40 parts by wt., particularly preferably 2 to 15 parts by wt. of a rubber-modified graft polymer,
C) 0 to 30 parts by wt., preferably 0 to 25 parts by wt. of a thermoplastic homo- and/or copolymer,
D) 0.1 to 40 parts by wt., preferably 1 to 25 parts by wt., particularly preferably 2 to 10 parts by wt. of a modified layered compound and
E) 0 to 30 parts by wt., preferably 1 to 20 parts by wt., in particular 4 to 15 parts by wt. of phosphorus compound.

All the parts by weight (herein pbw) data in the present Application are standardized such that the sum of the parts by weight of components A+B+C+D+E in the composition is 100.

The polycarbonate composition components which are suitable according to the invention are explained by way of example in the following.

Component A

Suitable aromatic polycarbonates and/or aromatic polyester carbonates are known and may be prepared by known processes (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester carbonates e.g. DE-A 3 077 934).

The preparation of aromatic polycarbonates is carried out e.g. by reaction of aromatic dihydroxy compounds (e.g. diphenols) with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or more than trifunctional, for example triphenols or tetraphenols. Alternatively the preparation may be via the known melt polymerization process entailing a reaction of diphenols with, for example, diphenyl carbonate.

Aromatic dihydroxy compounds for the preparation of the aromatic polycarbonates and/or aromatic polyester carbonates are preferably those of the formula (I)

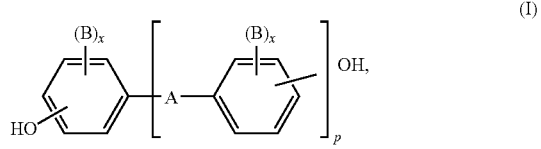

wherein
A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing heteroatoms can be fused, or a radical of the formula (II) or (III)

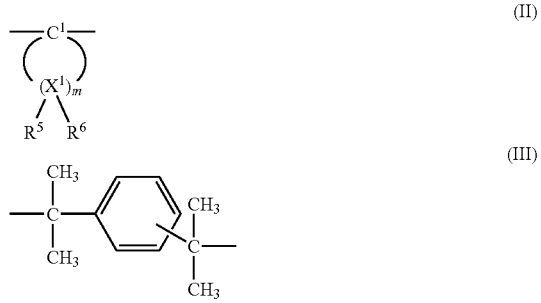

B in each case is $C_1$ to $C_{12}$-alkyl, preferably methyl, or halogen, preferably chlorine and/or bromine,
x in each case independently of one another, is 0, 1 or 2,
p is 1 or 0 and $R^5$ and $R^6$ individually selected for each $X^1$ and independently of one another denote hydrogen or $C_1$ to $C_6$-alkyl, preferably hydrogen, methyl or ethyl,
$X^1$ denotes carbon and
m denotes an integer from 4 to 7, preferably 4 or 5, with the proviso that on at least one atom $X^1$, $R^5$ and $R^6$ are simultaneously alkyl.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl)sulfones and α,α-bis-(hydroxyphenyl)-diisopropyl-benzenes and nucleus-brominated and/or nucleus-chlorinated derivatives thereof.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The aromatic dihydroxy compounds may be employed individually or as any desired mixtures. The diphenols are known or may be obtained by known processes.

Suitable chain terminators for the preparation of the thermoplastic, aromatic polycarbonates include phenol, p-chlorophenol, p-tert-butylphenol or 2,4,6-tribromophenol, and also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is between 0.5 and 10 mol %, based on the sum of the moles of the aromatic dihydroxy compounds employed.

The thermoplastic, aromatic polycarbonates have average weight-average molecular weights ($M_w$) measured e.g. by ultracentrifuge or scattered light measurement) of from 10,000 to 200,000 g/mol, preferably 15,000 to 80,000 g/mol, particularly preferably 24,000 to 32,000 g/mol.

The thermoplastic, aromatic polycarbonates may be branched in a known manner, and in particular by incorporation of 0.05 to 2.0 mol %, based on the sum of the aromatic dihydroxy compounds employed, of compounds which are trifunctional or more than trifunctional, for example those having three and more phenolic groups.

Both homopolycarbonates and copolycarbonates are suitable. It is also possible for 1 to 25 wt. %, preferably 2.5 to 25 wt. %, based on the total amount of diphenols to be employed, of polydiorganosiloxanes having hydroxyaryloxy end groups to be employed for the preparation of copolycarbonates according to the invention according to component A. These are known (U.S. Pat. No. 3,419,634) and may be prepared by known processes. The preparation of copolycarbonates containing polydiorganosiloxanes is described in DE-A 3 334 782.

Preferred polycarbonates are, in addition to the bisphenol A homopolycarbonates, the copolycarbonates of bisphenol A with up to 15 mol %, based on the sum of the moles of diphenols, of other aromatic dihydroxy compounds mentioned as preferred or particularly preferred, in particular 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether-4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, may be used additionally and concurrently as a bifunctional acid derivative in the preparation of polyester carbonates.

Possible chain terminators for the preparation of the aromatic polyester carbonates are, in addition to the monophenols already mentioned, also chlorocarbonic acid esters thereof as well as the acid chlorides of aromatic monocarboxylic acids, which may optionally be substituted by $C_1$ to $C_{22}$-alkyl groups or by halogen atoms, as well as aliphatic $C_2$ to $C_{22}$-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

The aromatic polyester carbonates may also contain incorporated aromatic hydroxylcarboxylic acids.

The aromatic polyester carbonates may be either linear or branched in a known manner (in this context see DE-A 2 940 024 and DE-A 3 007 934).

Branching agents which may be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane and 1,4-bis-[4,4'-dihydroxytriphenyl)-methyl]-benzene, in amounts of from 0.01 to 1.0 mol %, based on the diphenols employed. Phenolic branching agents may be initially introduced into the reaction vessel with the diphenols, and acid chloride branching agents may be introduced together with the acid dichlorides.

The content of carbonate structural units in the thermoplastic, aromatic polyester carbonates may be varied as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates may be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.35 (measured is on solutions of 0.5 g polycarbonate or polyester carbonate in 100 ml methylene chloride solution at 25° C.).

The thermoplastic, aromatic polycarbonates and polyester carbonates may be employed by themselves or in any desired mixture.

Component B

Component B is one or more graft polymers of

B.1 5 to 95, preferably 30 to 90 wt. % of at least one vinyl monomer on

B.2 95 to 5, preferably 70 to 10 wt. % of one or more graft bases having glass transition temperatures of <10° C., preferably <0° C., particularly preferably <−20° C.

The graft base B.2 in general has a median particle size ($d_{50}$ value) of from 0.05 to 10 µm, preferably 0.1 to 5 µm, particularly preferably 0.2 to 1 µm.

Monomers B.1 are preferably mixtures of

B.1.1 50 to 99 parts by wt. of vinylaromatics and/or nucleus-substituted vinylaromatics (such as styrene, α-methylstyrene, p-methylstyrene and p-chlorostyrene) and/or methacrylic acid ($C_1$-$C_8$)-alkyl esters (such as methyl methacrylate and ethyl methacrylate) and B.1.2 1 to 50 parts by weight (pbw) of vinyl cyanides (unsaturated nitriles, such as acrylonitrile and methacrylonitrile) and/or (meth)acrylic acid ($C_1$-$C_8$)-alkyl esters, such as methyl methacrylate, n-butyl acrylate and t-butyl acrylate, and/or derivatives (such as anhydrides and imides) of unsaturated carboxylic acids, for example maleic anhydride and N-phenyl-maleimide.

Preferred B.1.1 is at least one of the group of styrene, α-methylstyrene and methyl methacrylate, and preferred B.1.2 is at least one of the group of acrylonitrile, maleic anhydride and methyl methacrylate. Particularly preferred B.1.1 is styrene and B.1.2 is acrylonitrile.

Suitable graft base B.2 include, diene rubbers, EP(D)M rubbers, that is to say those based on ethylene/propylene (and optionally diene), acrylate, polyurethane, silicone, chloroprene and ethylene/vinyl acetate rubbers.

Preferred graft base B.2 is diene rubber, for example based on butadiene and isoprene, or mixtures of diene rubbers or copolymers of diene rubbers or mixtures thereof with further copolymerizable monomers (e.g. according to B.1.1 and B.1.2), with the proviso that the glass transition temperature of component. B.2 is below <10° C., preferably <0° C., particularly preferably <−10° C. Pure polybutadiene rubber is particularly preferred.

Particularly preferred polymers B include ABS polymers (emulsion, bulk and suspension ABS), such as are described e.g. in DE-OS 2 035 390 (U.S. Pat. No. 3,644,574) or in DE-OS 2 248 242 (=GB 1 409 275) and in Ullmanns, Enzyklopädie der Technischen Chemie, vol. 19 (1980), p. 280 et seq. The gel content of the graft base B.2 is at least 30 wt. %, preferably at least 40 wt. % (measured in toluene).

The graft copolymers B are prepared by free-radical polymerization, e.g. by emulsion, suspension, solution or bulk polymerization, preferably by emulsion or bulk polymerization.

Also particularly suitable graft rubbers are ABS polymers which are prepared in the emulsion polymerization process by redox initiation with an initiator system of organic hydroperoxide and ascorbic acid in accordance with U.S. Pat. No. 4,937,285 (incorporated herein by reference).

Since as is known the graft monomers are not grafted completely onto the graft base during the grafting reaction, according to the invention graft polymers B are also understood as meaning those products which are obtained by (co)polymerization of the grafting monomers in the presence of the graft base and are additionally obtained during working up.

Suitable acrylate rubbers according to B.2 of the polymers B are, preferably, polymers of acrylic acid alkyl esters, optionally with up to 40 wt. %, based on B.2, of other polymerizable, ethylenically unsaturated monomers. The preferred polymerizable acrylic acid esters include $C_1$ to $C_8$-alkyl esters, for example methyl, ethyl, butyl, n-octyl and 2-ethylhexyl esters; haloalkyl esters, preferably halo-$C_1$-$C_8$-alkyl esters, such as chloroethyl acrylate, and mixtures of these monomers.

For crosslinking, monomers having more than one polymerizable double bond may be copolymerized. Preferred examples of crosslinking monomers are esters of unsaturated monocarboxylic acids having 3 to 8 C atoms and unsaturated monofunctional alcohols having 3 to 12 C atoms, or saturated polyols having 2 to 4 OH groups and 2 to 20 C atoms, such as ethylene glycol dimethacrylate and allyl methacrylate; polyunsaturated heterocyclic compounds, such as trivinyl and triallyl-cyanurate; and polyfunctional vinyl compounds, such as di- and trivinylbenzenes; and also triallyl phosphate and diallyl phthalate. Preferred crosslinking monomers are allyl methacrylate, ethylene glycol dimethacrylate, diallyl phthalate and heterocyclic compounds which have at least three ethylenically unsaturated groups. Particularly preferred crosslinking monomers are the cyclic monomers triallyl cyanurate, triallyl isocyanurate, triacryloylhexahydro-s-triazine and triallylbenzenes. The amount of the crosslinking monomers is preferably 0.02 to 5, in particular 0.05 to 2 wt. %, based on the graft base B.2. In the case of cyclic crosslinking monomers having at least three ethylenically unsaturated groups, it is advantageous to limit the amount to less than 1 wt. % of the graft base B.2.

Preferred "other" polymerizable, ethylenically unsaturated monomers which may optionally serve for the preparation of the graft base B.2 in addition to the acrylic acid esters are e.g. acrylonitrile, styrene, α-methylstyrene, acrylamides, vinyl $C_1$-$C_6$-alkyl ethers, methyl methacrylate and butadiene. Preferred acrylate rubbers as the graft base B.2 are emulsion polymers which have a gel content of at least 60 wt. %.

Further suitable graft bases according to B.2 are silicone rubbers having grafting-active sites, such as are described in DE-OS 3 704 657, DE-OS 3 704 655, DE-OS 3 631 540 and DE-OS 3 631 539.

The gel content of the graft base B.2 is determined at 25° C. in a suitable solvent (M. Hoffmann, H. Krömer, R. Kuhn, Polymeranalytik I und II, Georg Thieme-Verlag, Stuttgart 1977).

The median particle size ($d_{50}$) is the diameter above and below which in each case 50 wt. % of the particles lie. It may be determined by means of ultracentrifuge measurement (W. Scholtan, H. Lange, Kolloid, Z. und Z. Polymere 250 (1972), 782-1796).

The graft polymers may be employed in the composition according to the invention in an amount of from 0.5 to 60, preferably 1 to 40, and most preferably 2 to 25 parts by weight (pbw). Mixtures of various graft polymers may also be present.

Component C

Component C comprises one or more thermoplastic vinyl (co)polymers C.1 and/or polyalkylene terephthalate C.2.

Suitable vinyl (co)polymers C.1 are polymers of at least one monomer from the group consisting of vinylaromatics, vinyl cyanides (unsaturated nitriles), (meth)acrylic acid ($C_1$-$C_8$)-alkyl esters, unsaturated carboxylic acids and derivatives (such as anhydrides and imides) of unsaturated carboxylic acids. (Co)polymers of C.1.1 50 to 99, preferably 60 to 80 parts by wt. of vinylaromatics and/or nucleus-substituted vinylaromatics, such as styrene, α-methylstyrene, p-methylstyrene and p-chlorostyrene, and/or methacrylic acid ($C_1$-$C_8$)-alkyl esters, such as methyl methacrylate and ethyl methacrylate, and C.1.2 1 to 50, preferably 20 to 40 parts by wt. of vinyl cyanides (unsaturated nitriles) such as acrylonitrile and methacrylonitrile, and/or (meth)acrylic acid ($C_1$-$C_8$)-alkyl esters, such as methyl methacrylate, n-butyl acrylate and t-butyl acrylate, and/or unsaturated carboxylic acids, such as maleic acid, and/or derivatives, such as anhydrides and imides, of unsaturated carboxylic acids, for example maleic anhydride and N-phenylmaleimide, are particularly suitable.

The vinyl (co)polymers C.1 are resinous, thermoplastic and rubber-free. The copolymer of C.1.1 styrene and C.1.2 acrylonitrile is particularly preferred.

The (co)polymers according to C.1 are known and may be prepared by free-radical polymerization, in particular by emulsion, suspension, solution or bulk polymerization. The (co)polymers preferably have average molecular weights Mw (weight-average, determined by light scattering or sedimentation) of between 15,000 and 200,000.

The polyalkylene terephthalates of component C.2 are reaction products of aromatic dicarboxylic acids or their reactive derivatives, such as dimethyl esters or anhydrides, and aliphatic, cycloaliphatic or araliphatic diols as well as mixtures of these reaction products.

Preferred polyalkylene terephthalates contain at least 80 mol %, preferably at least 90 mol %, based on the dicarboxylic acid component, of terephthalic acid radicals and at least 80 mol %, preferably at least 90 mol %, based on the diol component, of ethylene glycol radicals and/or butane-1,4-diol radicals and/or propane-1,3-diol radicals.

Preferred polyalkylene terephthalate may contain, in addition to terephthalic acid radicals, up to 20 mol %, preferably up to 10 mol % of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid or cyclohexanediacetic acid.

Preferred polyalkylene terephthalates may contain, in addition to ethylene glycol radicals and butane-1,4-diol radicals, up to 20 mol %, preferably up to 10 mol % of other aliphatic diols having 3 to 12 C atoms or cycloaliphatic diols having 6 to 21 C atoms, e.g. radicals of propane-1,3-diol, 2-ethylpropane-1,3-diol, neopentylglycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(4-β-hydroxyethoxyphenyl)-propane and 2,2-bis-(4-hydroxypropoxyphenyl)-propane (DE-A 2 407 674, 2 407 776 and 2 715 932).

The polyalkylene terephthalates may be branched by incorporation of relatively small amounts of 3- or 4-functional alcohols or 3- or 4-basic carboxylic acids, e.g. in accordance with DE-A 1 900 270 and U.S. Pat. No. 3,692,744. Examples of preferred branching agents are trimesic acid, trimellitic acid, trimethylolethane and propane and pentaerythritol.

Polyalkylene terephthalates which have been prepared solely from terephthalic acid and reactive derivatives thereof (e.g. dialkyl esters thereof) and ethylene glycol and/or butane-1,4-diol, and mixtures of these polyalkylene terephthalates are particularly preferred.

Mixtures of polyalkylene terephthalates comprise 1 to 50 wt. %, preferably 1 to 30 wt. % of polyethylene terephthalate and 50 to 99 wt. %, preferably 70 to 99 wt. % of polybutylene terephthalate.

The polyalkylene terephthalates preferably used in general have a limiting viscosity of 0.4 to 1.5 dl/g, preferably 0.5 to 1.2 dl/g, measured in phenol/o-dichlorobenzene (1:1 part by weight) at 25° C. in an Ubbelohde viscometer.

The polyalkylene terephthalates may be prepared by known methods (see e.g. Kunststoff-Handbuch, vol. VIII, p. 695 et seq., Carl-Hanser-Verlag, Munich 1973).

The composition according to the invention may comprise the vinyl (co)polymers or polyalkylene terephthalates in amounts of from 0 to 45, preferably 1 to 30 and particularly preferably 2 to 25 parts by weight (pbw).

Component D

Component D is an organically modified layered compound, the modification with organic polymer by means of a solvent-free melt process.

The preferred layered compounds are nanoscale, i.e. smaller than 100 nm, in one dimension. This dimension is called the "average thickness" of the layered compound in the following. Preferably, those layered compounds which have an average thickness of from 0.3 to 10 nm, particularly preferably of from 0.5 to 10 nm, especially preferably of from 0.7 to 2 nm are employed. The layers have a diameter of from 5 to 10,000 nm, preferably of from 10 to 2,000 nm, particularly preferably of from 10 to 1,000 nm. The cation exchange capacities of the anionic, non-modified layered compounds are between 10 and 260 meq/100 g. Counter-ions (i.e. cation) of the non-modified layered compounds may be calcium, magnesium, potassium, sodium or lithium ions, preferably sodium or lithium ions. These cations may either originate, for example, from natural (geological) sources comprising commercial minerals, or may be introduced in a targeted manner by ion exchange, as described by Lagaly (Lagaly, G., Reaktionen der Tonminerale. In: Tonminerale und Tone, Steinkopff Verlag, Darmstadt, 1993). The dimensions of the layered compounds (i.e. diameter or the average thickness of the layers of the layered compound) may be determined via TEM photographs and XRD measurements. The cation exchange capacity may be determined e.g. by the method of L. P. Meier and G. Kahr (Clays & Clay Minerals, 1999, 47, 3, p. 386-388).

Suitable layered compounds include the montmorillonite and hectorite mineral type and layered silicates or clay minerals allevardite, amesite, beidellite, fluorohectorite, fluorovermiculite, mica, halloysite, hectorite, illite, montmorillonite, muscovite, nontronite, palygorskite, saponite, sepiolite, smectite, stevensite, talc and vermiculite, synthetic talc types and the alkali metal silicates maghemite, magadiite, kenyaite, makatite, silinaite, grumantite and revdite. Also suitable are hydrated forms of these, and the associated crystalline silicas. Also suitable are other inorganic layered compounds, such as hydrotalcites, double hydroxides and hetero-poly acids.

Layered compounds which are preferably employed are those of the layered silicate type. The particularly preferred layered silicate is of the montmorillonite type, such as are contained as the main constituent in bentonite, and hectorite, having cation exchange capacity of 10 to 260 meq/100 g and a nano-scaled particle size, preferably with an average thickness of from 0.3 to 10 nm, particularly preferably of from 0.5 to 10 nm, especially preferably of from 0.7 to 2 nm, and a layer diameter of from 5 to 10,000 mm, preferably of from 10 to 2,000 nm, particularly preferably of from 10 to 1,000 mm (herein layered silicates).

According to the invention, the layered compound is modified with a least one organic polymer by means of a solvent-free melt process. The solvent-free melt process comprises
(1) a first step which is the mixing of the layered compound with a organic polymer component or a mixture of organic polymers,
(2) a second step which is heating the mixture resulting from (i) to a temperature higher than the melting range of the employed organic polymer or of the mixture of organic polymers, preferably under constant mixing, for example in internal kneaders or extruder aggregates, and
(3) optionally a third step which is cooling the mixture resulting from (ii) to room temperature. The modified layered compound is obtained as a solid.

In alternative, the mixture resulting from (ii) can be used as such and may be processed into the final molding composition directly, e.g. using a side extruder.

Polyalkylene oxides are preferably employed as organic polymers for this modification. Particularly preferred are polyalkylene oxides having a number-average molecular weight of from 106 to 20,000 g/mol, preferably of from 200 to 10,000 g/mol. It is also possible to employ mixtures of various polyalkylene oxides. Polyethylene oxides and polyethylene oxide/propylene oxide copolymers are preferably employed as the polyalkylene oxides. Linear polyethylene oxides are particularly preferably employed, and very particularly preferably poly(ethylene glycol) monomethyl ethers.

In a particularly preferred embodiment, further suitable oligomers or polymers may optionally also additionally be added in step (i). These further oligomers or polymers are selected from the group consisting of polycarbonate (according to component A) and polymethyl methacrylate (PMMA).

Component E

Phosphorus-containing flame retardant agent (E) in the invention is preferably at least one member selected from the group consisting of mono- and oligomeric phosphoric and phosphonic acid esters, phosphonatamines and phosphazenes. Other halogen-free phosphorus compounds which are not mentioned here specifically may also be employed, by themselves or in any desired combination with other halogen-free phosphorus compounds.

Preferred mono- and oligomeric phosphoric and phosphonic acid esters conform to formula (IV)

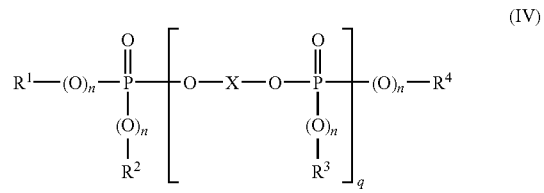

wherein
$R^1$, $R^2$, $R^3$ and $R^4$ independently of one another denote $C_1$ to $C_8$-alkyl, $C_5$ to $C_6$-cycloalkyl, $C_6$ to $C_{20}$-aryl or $C_7$ to $C_{12}$-aralkyl, in each case optionally halogenated or alkyl substituted, preferably chorine, bromine-or $C_1$ to $C_4$-alkyl-substituted,
n independently of one another, denotes 0 or 1,
q denotes 0 to 30 and X denotes a mono- or polynuclear aromatic radical having 6 to 30 C atoms or a linear or branched aliphatic radical having 2 to 30 C atoms, which may be OH-substituted and may contain up to 8 ether bonds.

Preferably, $R^1$, $R^2$, $R^3$ and $R^4$ independently of one another represent $C_1$ to $C_4$-alkyl, phenyl, naphthyl or phenyl-$C_1$-$C_4$-alkyl. The aromatic groups $R^1$, $R^2$, $R^3$ and $R^4$ may in their turn be substituted by halogen and/or alkyl groups, preferably chlorine, bromine and/or $C_1$ to $C_4$-alkyl. Particularly preferred aryl radicals are cresyl, phenyl, xylenyl, propylphenyl or butylphenyl and the corresponding brominated and chlorinated derivatives thereof X in the formula (IV) preferably denotes a mono- or polynuclear aromatic radical having 6 to 30 C atoms. This is preferably derived from aromatic dihydroxy compounds of the formula (I).

n in the formula (IV) may be, independently of one another, 0 or 1, and n is preferably 1.

q represents values of from 0 to 30. If mixtures of various components of the formula (IV) are employed, mixtures preferably having number-average q values of from 0.3 to 20, particularly preferably 0.5 to 10, in particular 0.5 to 6 may be used.

X particularly preferably represents

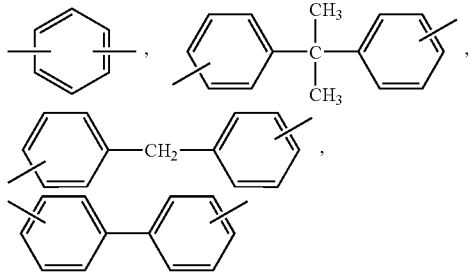

or chlorinated or brominated derivatives thereof, and in particular X is derived from resorcinol, hydroquinone, bisphenol A or diphenylphenol. X is particularly preferably derived from bisphenol A.

The use of oligomeric phosphoric acid esters of the formula (IV) which are derived from bisphenol A is particularly advantageous, since the compositions provided with this phosphorus compound have a particularly high resistance to stress-cracking and hydrolysis and a particularly low tendency towards the formation of deposits during processing by injection molding. Furthermore, a particularly high heat distortion temperature may be achieved with these flame retardant agents.

Monophosphates (q=0), oligophosphates (q=1-30) or mixtures of mono- and oligophosphates may be employed as component E according to the invention. Monophosphorus compounds of the formula (IV) are, in particular, tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, halogen-substituted aryl phosphates, methylphosphonic acid dimethyl ester, methylphosphonic acid diphenyl ester, phenylphosphonic acid diethyl ester, triphenylphosphine oxide or tricresylphosphine oxide.

The phosphorus compounds according to component E formula (IV) are known (cf. e.g. EP-A 363 608, EP-A 640 655) or may be prepared by known methods in an analogous manner (e.g. Ullmanns Enzyklopädie der technischen Chemie, vol. 18, p. 301 et seq. 1979; Houben-Weyl, Methoden der organischen Chemie, vol. 12/1, p. 43; Beilstein vol. 6, p. 177).

The mean q values may be determined by determining the composition of the phosphate mixture (molecular weight distribution) by means of a suitable method (gas chromatography (GC), high pressure liquid chromatography (HPLC) or gel permeation chromatography (GPC)), and calculating the mean values for q therefrom.

Phosphonatamines are preferably compounds of the formula (V)

$$A_{3-y}\text{-}NB^1_y \qquad (V)$$

in which

A represents a radical of the formula (Va)

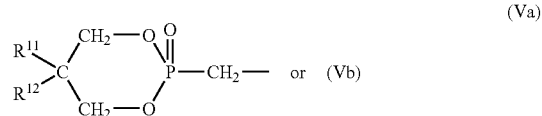

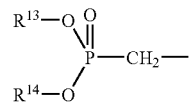

$R^{11}$ and $R^{12}$ independently of one another represent unsubstituted or substituted $C_1$-$C_{10}$-alkyl or unsubstituted or substituted $C_6$ to $C_{10}$-aryl, $R^{13}$ and $R^{14}$ independently of one another represent unsubstituted or substituted $C_1$ to $C_{10}$-alkyl or unsubstituted or substituted $C_6$ to $C_{10}$-aryl or $R^{13}$ and $R^{14}$ together represent unsubstituted or substituted $C_3$ to $C_{10}$-alkylene, y denote the numerical values 0, 1 or 2 and $B^1$ independently represents hydrogen, optionally halogenated $C_2$ to $C_8$-alkyl or unsubstituted or substituted $C_6$ to $C_{10}$-aryl.

$B^1$ preferably independently represents hydrogen, or ethyl or n- or iso-propyl, which may be substituted by halogen, or unsubstituted or $C_1$, to $C_4$-alkyl- and/or halogen-substituted $C_6$ to $C_{10}$-aryl, in particular phenyl or naphthyl.

Alkyl in $R^{11}$, $R^{12}$, $R^{13}$ and $R^{14}$ independently preferably represents methyl, ethyl, n-propyl, iso-propyl, n-, iso-, sec- or tert-butyl, pentyl or hexyl.

Substituted alkyl in $R^{11}$, $R^{12}$, $R^{13}$ and $R^{14}$ independently preferably represents $C_1$ to $C_{10}$-alkyl substituted by halogen, in particular mono- or disubstituted methyl, ethyl, n-propyl, iso-propyl, n-, iso-, sec- or tert-butyl, pentyl or hexyl.

$C_6$ to $C_{10}$-aryl in $R^{11}$, $R^{12}$, $R^{13}$ and $R^{14}$ independently preferably represents phenyl, naphthyl or binaphthyl, in particular o-phenyl, o-naphthyl, o-binaphthyl, which may be (in general mono-, di- or tri-) substituted by halogen.

$R^{13}$ and $R^{14}$, together with the oxygen atoms to which they are bonded directly and the phosphorus atom, may form a ring structure.

Compounds which are mentioned by way of example and as preferred are: 5,5,5',5',5'',5''-hexamethyltris(1,3,2-dioxaphosphorinane-methane)amino-2,2',2''-trioxide of the formula (Va-1)

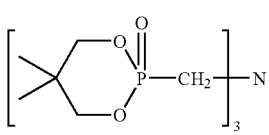
(Va-1)

1,3,2-dioxaphosphorinane-2-methanamine, N-butyl-N-[(5,5-dimethyl-1,3,2-dioxaphosphorinan-2-yl)methyl]-5,5-dimethyl-, P,2-dioxide; 1,3,2-dioxaphosphorinane-2-methanamine, N-[[5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)-methyl]-5,5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane-2-methanamine, N,N-di-(4-chlorobutyl)-5,5-dimethyl-, 2-oxide; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P,2-dioxide.

Compounds which are furthermore preferred are:
Compounds of the formula (Va-2) or (Va-3)

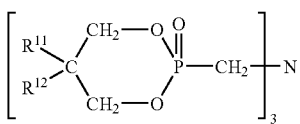
(Va-2)

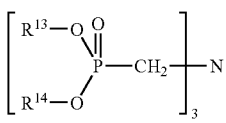
(Va-3)

wherein
$R^{11}$, $R^{12}$, $R^{13}$ and $R^{14}$ have the abovementioned meanings.

Compounds of the formula (Va-2) and (Va-1) are particularly preferred. The preparation of the phosphonatamines is described, for example, in U.S. Pat. No. 5,844,028.

Phosphazenes are compounds of the formula (VIa) and (VIb)

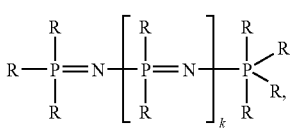
(VIa)

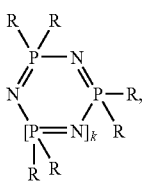
(VIb)

wherein
R in each case is identical or different and represents amino, in each case optionally halogenated, preferably halogenated with fluorine, $C_1$ to $C_8$-alkyl, or $C_1$ to $C_8$-alkoxy, in each case optionally alkyl-, preferably $C_1$ to $C_4$-alkyl-, and/or halogen-, preferably chlorine- and/or bromine-substituted $C_5$ to $C_6$-cycloalkyl, $C_6$ to $C_{20}$-aryl, preferably phenyl or naphthyl, $C_6$ to $C_{20}$-aryloxy, preferably phenoxy or naphthyloxy, or $C_7$ to $C_{12}$-aralkyl, preferably phenyl-$C_1$-$C_4$-alkyl, k represents 0 or a number from 1 to 15, preferably a number from 1 to 10.

Examples include propoxyphosphazene, phenoxyphosphazene, methyl-phenoxphosphazene, aminophosphazene and fluoroalkylphosphazenes. Phenoxy-phosphazene is preferred.

The phosphazenes may be employed by themselves or as a mixture. The radical R may always be identical, or 2 or more radicals in the formula (Ia) and (Ib) may be different. Phosphazenes and their preparation are described, for example, in EP-A 728 811, DE-A 1 961668 and WO 97/40092.

The flame retardant agents may be employed by themselves or in any desired mixture with one another or in a mixture with other flame retardant agents. The phosphorus-containing flame retardant agent may be employed in the composition according to the invention in an amount of from 0.1 to 30, preferably 1 to 25 and most preferably 2 to 20 parts by weight (pbw).

Component F

The flame retardant agent of component E is often used in combination with so-called antidripping agent which reduces the tendency of the material to burning dripping in the event of fire. Examples include fluorinated polyolefins, silicones and aramid fibres. These may also be employed in the compositions according to the invention. Fluorinated polyolefins are preferred. The mixture in general comprises the fluorinated polyolefins in an amount of from 0.01 to 3, preferably 0.05 to 1.5 parts by wt.

Fluorinated polyolefins are known and are described, for example, in EP-A 0 640 655. They are marketed under the brand name Teflon®, for example Teflon 30N, by DuPont.

The fluorinated polyolefins may be employed both in the pure form and in the form of a coagulated mixture of emulsions of the fluorinated polyolefins with emulsions of the graft polymers (component B) or with an emulsion of a copolymer, preferably based on styrene/acrylonitrile, the fluorinated polyolefin being mixed as an emulsion with an emulsion of the graft polymer or of the copolymer and then being coagulated.

The fluorinated polyolefins may furthermore be employed as a precompound with the graft polymer (component B) or a copolymer, preferably based on styrene/acrylonitrile. The fluorinated polyolefins are mixed as a powder with a powder or granules of the graft polymer or copolymer and compounded in the melt, in general at temperatures of from 200 to 330° C., in conventional units, such as internal kneaders, single or twin screw extruders.

The fluorinated polyolefins may also be employed in the form of a masterbatch which is prepared by emulsion polymerization of at least one monoethylenically unsaturated monomer in the presence of an aqueous dispersion of the fluorinated polyolefin. Preferred monomer components are styrene, acrylonitrile and mixtures thereof. After acidic precipitation and subsequent drying, the polymer is employed as a free-flowing powder.

The coagulates, precompounds or masterbatches conventionally have solids contents of fluorinated polyolefin of from 5 to 95 wt. %, preferably 7 to 60 wt. %.

Component G

The composition may contain further conventional polymer additives (component G), such as other flame retardant agents, lubricants and mold release agents, for example pentaerythritol tetrastearate, nucleating agents, antistatics, stabilizers, fillers and reinforcing substances (for example glass fibres or carbon fibres, mica, kaolin, talc, $CaCO_3$ and glass flakes) as well as dyestuffs and pigments.

Preparation of the Molding Compositions and Shaped Articles

The thermoplastic molding compositions according to the invention are prepared by mixing the particular constituents in a known manner and subjecting the mixture to melt compounding at temperatures of from 200° C. to 300° C. in conventional units, such as internal kneaders, single or twin-screw extruders.

The mixing of the individual constituents may be carried out in a known manner either successively or simultaneously, and in particular either at about 20° C. (room temperature) or at a higher temperature.

In a preferred embodiment
  (i) in a first step the layered compound is modified with organic polymers, preferably with polyalkylene oxides having a number-average molecular weight of from 106 to 20,000 g/mol, particularly preferably of from 200 to 10,000 g/mol, it also being possible for mixtures of various polyalkylene oxides to be employed, by means of a solvent-free melt process,
  (ii) in a second step the layered compound masterbatch obtained from (i) is mixed in a known manner with component (A) and optionally further components chosen from the group consisting of (B), (C), (E), (F) and (G) and
  (iii) in a third step the mixture from (ii) is subjected to melt compounding and melt extrusion at temperatures of from 200° C. to 300° C. in conventional units, such as internal kneaders, single or twin screw extruders, it being possible for the layered compound masterbatch resulting in the first step (i) to be isolated or also to be processed directly as a melt, preferably using a side extruder, into the molding composition in step (ii).

In a particularly preferred embodiment, further oligomers or polymers selected from the group consisting of polycarbonate (according to component A) and polymethyl methacrylate (PMMA) are employed in the first step (i).

Due to their high thermal stability and their good mechanical properties, the thermoplastic molding compositions according to the invention are suitable for the production of all types of shaped articles, in particular those having increased requirements of the maximum heat release rates.

The molding compositions according to the invention may be used for the production of all types of shaped articles. These may be produced by injection molding, extrusion and the blow molding process. Another form of processing is the production of shaped articles by thermoforming from previously produced sheets or films.

The present invention therefore also provides the use of the molding compositions according to the invention for the production of all types of shaped articles, preferably those mentioned above, and the shaped articles from the molding compositions according to the invention.

Examples of such shaped articles are films, profiles, all types of housing components, e.g. for domestic appliances, such as juice presses, coffee machines and mixtures; for office machines, such as monitors, flat screens, notebooks, printers and copiers; sheets, pipes, electrical installation conduits, windows, doors and further profiles for the building sector (interior finishing and exterior uses), as well as electrical and electronic components, such as switches, plugs and sockets, and components for utility vehicles, in particular for the automobile sector.

The molding compositions according to the invention may also be used in particular, for example, for the production of the following shaped articles or moldings: interior finishing components for track vehicles, ships, aircraft, buses and other motor vehicles, housings of electrical equipment containing small transformers, housings for equipment for processing and transmission of information, housings and facings for medical equipment, massage equipment and housings therefor, toy vehicles for children, flat wall elements, housings for safety equipment, thermally insulated transportation containers, moldings for sanitary and bath fittings, cover gratings for ventilator openings and housings for garden equipment.

The following examples serve to further explain the invention.

EXAMPLES

Component A1

Branched polycarbonate based on bisphenol A having a relative solution viscosity of 1.34, measured in methylene chloride at 25° C. and in a concentration of 0.5 g/100 ml Component A2

Linear polycarbonate based on bisphenol A having a relative solution viscosity of 1.20, measured in methylene chloride at 25° C. and in a concentration of 0.5 g/100 ml Component B ABS polymer prepared by emulsion polymerization of 43 wt. %, based on the ABS polymer, of a mixture of 27 wt. % acrylonitrile and 73 wt. % styrene in the presence of 57 wt. %, based on the ABS polymer, of a particulate crosslinked polybutadiene rubber (median particle diameter $d_{50}$=0.35 μm).

Component D1

Cationically modified layered silicate (modified with stearylbenzyldimethyl-ammonium chloride) (Nanofil 9, powder, specific gravity approx. 1.8 g/cm³, average particle size 8 μm, primary particle size with complete dispersion approx. 100-500 nm×1 nm, manufacturer Süd-Chemie AG).

Component D2

Layered silicate/polymer masterbatch (according to the invention)

For the preparation of the layered silicate/polymer masterbatch, the starting substances listed in Table 1 are kneaded at 240° C. for 5 minutes in a 10 ml micro-extruder (DSM), let off and cooled to room temperature.

TABLE 1

Preparation of the layered silicate/polymer masterbatch

| Component | Amount weighed [g] |
| --- | --- |
| A2 | 4.4 |
| D2-1 | 5.5 |
| D2-2 | 0.8 |
| D2-3 | 0.3 |
| G3 | $1.15 * 10^{-3}$ |

Component D2-1

Nanofil 757 (highly pure sodium montmorillonite, powder, specific gravity approx. 2.6 g/cm³, average particle size <10 µm, primary particle size with complete dispersion approx. 500 nm×1 nm, manufacturer Süd-Chemie AG). The dimensions were determined by means of TEM photographs and XRD measurements: average layer thickness of 1 nm and layer diameter of approx. 300-1,000 nm.

Component D2-2

Poly-(ethylene glycol) monomethyl ether (average molecular weight (number-average) Mn 350) (Sigma-Aldrich Chemie)

Component D2-3

Polyethylene glycol monomethyl ether (average molecular weight (number-average) Mn 2,000) (Sigma-Aldrich Chemie)

Component E

Oligophosphate based on bisphenol A

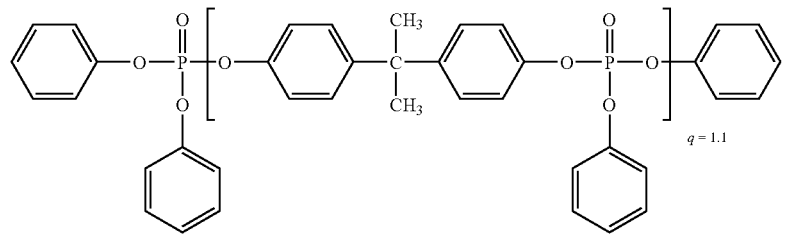

Component F

Polytetrafluoroethylene powder, CFP 6000 N, Du Pont

Component G1

Pentaerythritol tetra stearate

Component G2

Phosphite stabilizer

Component G3

Tetraphenylphosphonium phenolate

Preparation and Testing of the Molding Compositions According to the Invention

The starting substances listed in Table 2 are compounded on a twin-screw extruder (ZSK-25) (Werner und Pfleiderer) at a speed of rotation of 225 rpm and a throughput of 20 kg/h at a machine temperature of 260° C. and the compound is granulated. The total batch size is in each case 8 kg. Example 1 represents the comparison without addition of layered silicate, Example 2 contains a commercially obtainable cationically modified layered silicate as a comparison, and Example 3 contains the layered silicate/polymer masterbatch described above.

The finished granules are processed to the corresponding test specimens on an injection molding machine (melt temperature 260° C., mold temperature 80° C., melt front speed 240 mm/s) and these are characterized in accordance with ISO 1133 (MVR), ISO 5660-1 (cone calorimetry) and ASTM E 662 (smoke density) and by means of thermogravimetric analysis (TGA).

The determination of the melt volume flow rate (MVR value) is carried out in accordance with ISO 1133 (260° C.; 5 kg).

The determination of the cone calorimeter measurement (50 kW/m², 60 mm distance) is carried out in accordance with ISO 5660-1.

The determination of the smoke density is carried out in accordance with ASTM E 662 (with ignition flame d=3 mm).

The thermogravimetric analysis (TGA) was carried out with a TGA/SDTA 851e (Mettler-Toledo). Approx. 10 mg of the samples were weighed and were flushed under a gas mixture of 20% oxygen in helium at a flow rate of 80 ml/min at 25° C. for 30 min and then heated up to 800° C. at a heating rate of 5 K/min. During the entire measurement, the change in weight was monitored continuously and the masses were recorded in a mass spectrometer. The temperature range for the decomposition, which was obtained from the percentage weight decrease or weight loss rate measured (in % min$^{-1}$), is stated in Table 2. The starting value corresponds to the start of the decomposition, and the end value to the end of the decomposition.

TABLE 2

Composition and properties of the molding compositions

| Component (wt. %) | 1 (comparison) | 2 (comparison) | 3 |
|---|---|---|---|
| A1 | 84.80 | 80.95 | 79.80 |
| B | 4.70 | 4.70 | 4.70 |
| E | 10.10 | 10.10 | 10.10 |
| D1 | | 3.85 | |
| D2 | | | 5.00 |
| F | 0.10 | 0.10 | 0.10 |
| G1 | 0.20 | 0.20 | 0.20 |
| G2 | 0.10 | 0.10 | 0.10 |
| MVR 260° C./5 kg [cm³/10 min] | 13.8 | 92.4 | 15.2 |
| Cone calorimeter measurement, heat release (maximum) [kW/m²] | 320.3 | 353.1 | 238.4 |
| MARHE value | 133.0 | 173.6 | 142.6 |
| Smoke density according to ASTM E 662, Ds after 4 min | 419 | 707 | 357 |
| TGA, decomposition temperature [° C.] | 320-625 | 320-635 | 340-675 |

It may be seen from Table 2 that by addition of the layered silicate/polymer masterbatch according to the invention (Example 3), the smoke density according to ASTM E 662 is lowered, the maximum heat release rate (determined by means of cone calorimetry) is reduced and furthermore the decomposition temperature (thermogravimetric analysis) is increased, the melt volume-flow rate (MVR value) remaining unchanged, within the measurement accuracy, compared with the molding composition without filler (Comparison Example 1).

Furthermore, a lower MARHE value is achieved compared to the use of cationically modified layered silicates (Comparison Example 2) (MARHE=maximum average rate of heat emission). The molding composition according to Comparison Example 2 comprising cationically modified layered silicate gives a significantly increased MVR value compared with Comparison Example 1 and Example 3 according to the invention, which indicates an increased molecular weight degradation of the polycarbonate matrix.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising
   A) an aromatic polycarbonate and/or polyester carbonate in an amount of 30 to 99.9 pbw,
   B) an impact modifier in an amount of 1 to 40 pbw, wherein component B comprises a rubber-modified graft polymer of
      B.1) 5 to 95 percent based on the weight of B), of the polymerized product of a mixture including
         B.1.1) 50 to 99 percent, based on the weight of B.1), of at least one monomer selected from the group consisting of vinylaromatics, nucleus-substituted vinyl aromatics and (meth)acrylic acid (C1-C8)-alkyl esters and
         B.1.2) 1 to 50 percent based on the weight of B.1), of at least one monomer selected from the group consisting of vinyl cyanides, (meth)acrylic acid (C1-C8)-alkylesters and derivatives of unsaturated carboxylic acids
      grafted on
      B.2) 95 to 5 percent based on the weight of B), of one or more graft bases having a glass transition temperature lower than $-10°$ C.,
   C) a thermoplastic homo- and/or copolymer in an amount of 0 to 30 pbw,
   D) a modified layered compound in an amount of 0.1 to 40 pbw, the modification with organic polymer by means of a solvent-free melt process, wherein said organic polymer is polyalkylene oxide or a mixture of polyalkylene oxides having a number-average molecular weight of 106 to 20,000 g/mol, and
   E) a phosphorus compound in an amount of 1 to 20 pbw, conforming to formula (IV)

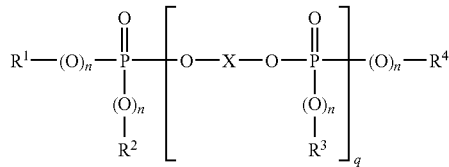

(IV)

wherein
   $R^1$, $R^2$, $R^3$, and $R^4$ independently of one another denote $C_1$ to $C_8$-alkyl, $C_5$ to $C_6$-cycloalkyl, $C_6$ to $C_{20}$-aryl or $C_7$ to $C_{12}$-aralkyl, in each case optionally halogenated or alkyl substituted,
   n independently of one another, denotes 0 or 1,
   q denotes 0 to 30 and
   X denotes a mono- or polynuclear aromatic radical having 6 to 30 C atoms or a linear or branched aliphatic radical having 2 to 30 C atoms, which may be OH-substituted and may contain up to 8 ether bonds, and,
   wherein the sum of the parts by weight of components A, B, C, D and E is 100.

2. The composition according to claim 1 wherein
   A) is present in an amount of 40 to 90 pbw,
   B) is present in an amount of 2 to 15 pbw,
   C) is present in an amount of 0 to 25 pbw,
   D) is present in an amount of 1 to 25 pbw and
   E) is present in an amount of 4 to 15 pbw wherein the sum of the parts by weight of components A, B, C, D and E is 100.

3. The composition according to claim 1, wherein the modified layered compound has an average thickness of from 0.3 to 10 nm.

4. The composition according to claim 3, wherein the modified layered compound comprises layers having diameters of 5 to 10,000 nm.

5. The composition according to claim 1 wherein said organic polymer contains a further polymer.

6. The composition according to claim 1, wherein B.1.1) is styrene and B.1.2) is acrylonitrile.

7. The composition according to claim 6, wherein B.2) comprises diene rubber.

8. The composition according to claim 1 wherein said C) is a (co)polymer of
   C.1 50 to 99 percent based on the weight of C), of at least one monomer selected from the group consisting of vinylaromatics, nucleus-substituted vinylaromatics and (meth)acrylic acid ($C_1$-$C_8$)alkyl esters and
   C.2 1 to 50 percent based on the weight of C) of at least one monomer selected from the group consisting of vinyl cyanides, (meth)acrylic acid ($C_1$-$C_8$)-alkyl esters, unsaturated carboxylic acids and derivatives of unsaturated carboxylic acids.

9. The composition according to claim 1 wherein said solvent-free melt process comprises
   (1) a first step which is the mixing of the layered compound with said organic polymer and
   (2) a second step which is heating the mixture resulting from (1) to a temperature higher than the melting range of said organic polymer.

10. The composition of claim 1 wherein the phosphorus compound is an oligophosphate.

11. The composition according to claim 1 further containing at least one member selected from the group consisting of flame retardant agents, antidripping agents, lubricants, mold release agents, nucleating agents, antistatics, stabilizers, fillers, reinforcing substances, dyestuffs and pigments.

12. A process for the preparation of the thermoplastic molding composition of claim 1 comprising
   (i) modifying a layered compound with polyalkylene oxides or a mixture of polyalkylene oxides having a number-average molecular weight of from 106 to 20,000 g/mol by means of a solvent-free melt process,
   (ii) mixing in a second step the layered compound masterbatch obtained from (i) with components (A), (B), and (E), and optionally further components chosen from (C) and
   (iii) subjecting in a third step the mixture from (ii) to melt compounding and melt extrusion at temperatures of from 200° C. to 300° C.

13. A molded article comprising the composition of claim 1.

14. The composition of claim 1, consisting essentially of components A, B, C, D and E.

15. A thermoplastic molding composition consisting of
A) an aromatic polycarbonate and/or polyester carbonate in an amount of 30 to 99.9 pbw,
B) an impact modifier in an amount of 1 to 40 pbw, wherein component B comprises a rubber-modified graft polymer of
   B.1) 5 to 95 percent based on the weight of B), of the polymerized product of a mixture including
      B.1.1) 50 to 99 percent, based on the weight of B.1), of at least one monomer selected from the group consisting of vinylaromatics, nucleus-substituted vinylaromatics and (meth)acrylic acid ($C_1$-$C_8$)-alkylesters and
      B.1.2) 1 to 50 percent based on the weight of B.1), of at least one monomer selected from the group consisting of vinyl cyanides, (meth)acrylic acid ($C_1$-$C_8$)-alkylesters and derivatives of unsaturated carboxylic acids
   grafted on
   B.2) 95 to 5 percent based on the weight of B), of one or more graft bases having a glass transition temperature lower than $-10°$ C.
C) a thermoplastic homo- and/or copolymer in an amount of 0 to 30 pbw,
D) a modified layered compound in an amount of 0.1 to 40 pbw, the modification with organic polymer by means of a solvent-free melt process, wherein said organic polymer is polyalkylene oxide or a mixture of polyalkylene oxides having a number-average molecular weight of 106 to 20,000 g/mol, and
E) a phosphorus compound in an amount of 1 to 20 pbw, conforming to formula (IV)

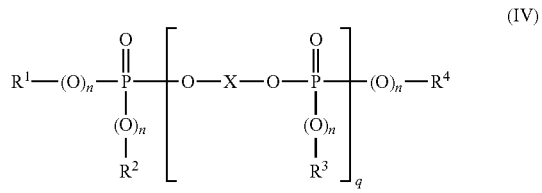

wherein
$R^1$, $R^2$, $R^3$ and $R^4$ independently of one another denote $C_1$ to $C_8$-alkyl, $C_5$ to $C_6$-cycloalkyl, $C_6$ to $C_{20}$-aryl or $C_7$ to $C_{12}$-aralkyl, in each case optionally halogenated or alkyl substituted,
n independently of one another, denotes 0 or 1,
q denotes 0 to 30 and
X denotes a mono- or polynuclear aromatic radical having 6 to 30 C atoms or a linear or branched aliphatic radical having 2 to 30 C atoms, which may be OH-substituted and may contain up to 8 ether bonds, and,
wherein the sum of the parts by weight of components A, B, C, D and E is 100.

* * * * *